US012049744B2

(12) United States Patent
Hijikata et al.

(10) Patent No.: US 12,049,744 B2
(45) Date of Patent: Jul. 30, 2024

(54) WORK MACHINE

(71) Applicant: Hitachi Construction Machinery Co., Ltd., Tokyo (JP)

(72) Inventors: Seiji Hijikata, Tsukuba (JP); Yasutaka Tsuruga, Ryugasaki (JP); Masatoshi Hoshino, Tsuchiura (JP); Ryou Yagisawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/272,121

(22) PCT Filed: Jan. 19, 2022

(86) PCT No.: PCT/JP2022/001835

§ 371 (c)(1),
(2) Date: Jul. 13, 2023

(87) PCT Pub. No.: WO2022/201792

PCT Pub. Date: Sep. 29, 2022

(65) Prior Publication Data

US 2024/0068203 A1 Feb. 29, 2024

(30) Foreign Application Priority Data

Mar. 24, 2021 (JP) ................................ 2021-050506

(51) Int. Cl.

*E02F 9/22* (2006.01)
*E02F 9/12* (2006.01)
*F15B 1/02* (2006.01)

(52) U.S. Cl.

CPC ............ *E02F 9/2217* (2013.01); *E02F 9/123* (2013.01); *E02F 9/2228* (2013.01); *F15B 1/024* (2013.01);

(Continued)

(58) Field of Classification Search

CPC ................ F15B 1/024; F15B 2211/212; F15B 2211/625; E02F 9/123; E02F 9/2217; E02F 9/2228; E02F 9/2235; E02F 9/2242

See application file for complete search history.

(56) References Cited

U.S. PATENT DOCUMENTS 9,290,911 B2 * 3/2016 Ma .......................... F15B 1/024
9,618,014 B2 * 4/2017 Morris .................... E02F 3/425

(Continued)

FOREIGN PATENT DOCUMENTS

JP 2010-60056 A 3/2010
JP 2011-17427 A 1/2011

(Continued)

OTHER PUBLICATIONS

International Preliminary Report on Patentability (PCT/IB/338) issued in PCT Application No. PCT/JP2022/001835 dated Sep. 28, 2023 including English translation of document C3 (Japanese-language International Preliminary Report on Patentabiiity (PCT/IPEA/409), filed on Jul. 13, 2023 (4 pages).

(Continued)

*Primary Examiner* — Thomas E Lazo
(74) *Attorney, Agent, or Firm* — Crowell & Moring LLP

(57) ABSTRACT

A work machine includes a hydraulic pump that is driven by an engine and delivers a pressurized fluid, a hydraulic actuator that is operated by the pressurized fluid delivered by the hydraulic pump, a hydraulic accumulator device that accumulates the pressurized fluid discharged from the hydraulic actuator, a differential pressure control valve that is disposed between the hydraulic actuator and the hydraulic accumulator device and generates a differential pressure across the differential pressure control valve between a pressure of the hydraulic actuator and a pressure of the hydraulic accumulator device, a pressure sensor that senses the pressure of the hydraulic accumulator device, and a (Continued)

controller that controls the differential pressure control valve on the basis of a sensing result of the pressure sensor. The controller controls the differential pressure control valve in such a manner that the differential pressure across the differential pressure control valve reduces according to a rise in the pressure of the hydraulic accumulator device sensed by the pressure sensor.

1 Claim, 8 Drawing Sheets

(52) U.S. Cl.
CPC ... *F15B 2211/212* (2013.01); *F15B 2211/625* (2013.01)

(56) References Cited

U.S. PATENT DOCUMENTS

2011/0265467 A1 11/2011 Kawasaki
2014/0208728 A1* 7/2014 Ma .......................... E02F 9/123 91/363 R
2017/0204887 A1* 7/2017 Matsuzaki .............. F15B 21/14
2019/0177952 A1 1/2019 Ito et al.

FOREIGN PATENT DOCUMENTS

| | | | |
|---|---|---|---|
| JP | 2016-205492 | A | 12/2016 |
| JP | 2016-205497 | A | 12/2016 |
| JP | 2017-119974 | A | 7/2017 |
| JP | 2018-151013 | A | 9/2018 |
| JP | 2019-135406 | A | 8/2019 |
| WO | WO 2016/056442 | A1 | 4/2016 |

OTHER PUBLICATIONS

International Search Report (PCT/ISA/210) issued in PCT Application No. PCT/JP2022/001835 dated Apr. 19, 2022 with English translation (4 pages).
Japanese-language Written Opinion (PCT/ISA/237) issued in PCT Application No. PCT/JP2022/001835 dated Apr. 19, 2022 (4 pages).
Japanese-language International Preliminary Report on Patentability (PCT/IPEA/409) issued in PCT Application No. PCT/JP2022/001835 dated Feb. 15, 2023, including Annexes with partial English translation (27 pages).

* cited by examiner

WORK MACHINE

TECHNICAL FIELD

The present invention relates to a work machine such as a hydraulic excavator including an accumulator.

BACKGROUND ART

A work machine is known that includes an engine power assist system that accumulates potential energy that a work device has in an accumulator through a boom cylinder and accumulates kinetic energy that a swing structure has in the accumulator through a swing motor, and uses the energy for assistance of engine power (refer to patent document 1).

In patent document 1, a hydraulic circuit in which a drive circuit of the swing motor is made to communicate with a line for swing energy recovery through a check valve and the line for swing energy recovery is connected to the accumulator through a sequence valve is disclosed.

PRIOR ART DOCUMENT

Patent Document

Patent Document 1: JP-2016-205492-A

SUMMARY OF THE INVENTION

Problem to be Solved by the Invention

A differential pressure generated across the sequence valve described in patent document 1 is settled at a value set in advance due to a spring force. Thus, there is a possibility that the source pressure on the inlet side of the sequence valve changes and operation of the swing motor becomes unstable if the back pressure on the accumulator side of the sequence valve changes when a pressurized fluid discharged from the swing motor is accumulated by the accumulator.

The present invention intends to provide a work machine that can allow a hydraulic actuator to stably operate when a pressurized fluid discharged from the hydraulic actuator is accumulated in a hydraulic accumulator device.

Means for Solving the Problem

A work machine according to one aspect of the present invention includes an engine, a hydraulic pump that is driven by the engine and delivers a pressurized fluid, a hydraulic actuator that is operated by the pressurized fluid delivered by the hydraulic pump, a hydraulic accumulator device that accumulates the pressurized fluid discharged from the hydraulic actuator, a differential pressure control valve that is disposed between the hydraulic actuator and the hydraulic accumulator device and generates a differential pressure across the differential pressure control valve between a pressure of the hydraulic actuator and a pressure of the hydraulic accumulator device, a pressure sensor that senses the pressure of the hydraulic accumulator device, and a controller that controls the differential pressure control valve on the basis of a sensing result of the pressure sensor. The work machine further includes a track structure, and a swing structure swingably disposed over the track structure. The hydraulic actuator is a swing motor that causes the swing structure to swing, the differential pressure control valve is a pressure control valve in which a set differential pressure is adjusted according to a control current that is output by the controller and is supplied to a solenoid, and the differential pressure control valve is closed when a difference between a brake pressure of the swing motor and the pressure of the hydraulic accumulator device is equal to or smaller than the set differential pressure and is opened when the difference exceeds the set differential pressure. The controller is configured to: store a differential pressure characteristic that is set in advance in such a manner that the set differential pressure of the differential pressure control valve decreases as the pressure of the hydraulic accumulator device increases and that the brake pressure of the swing motor that is a pressure on an upstream side of the differential pressure control valve is kept constant even when the pressure of the hydraulic accumulator device changes, and a control current characteristic that is set in advance in such a manner that a control current value increases as the set differential pressure of the differential pressure control valve increases; refer to the differential pressure characteristic and compute the set differential pressure of the differential pressure control valve on the basis of the pressure of the hydraulic accumulator device sensed by the pressure sensor; refer to the control current characteristic and compute the control current value of the differential pressure control valve on the basis of the set differential pressure computed; and output the control current according to the control current value computed to the solenoid of the differential pressure control valve.

Advantages of the Invention

According to the present invention, it is possible to provide a work machine that can allow a hydraulic actuator to stably operate when the pressurized fluid discharged from the hydraulic actuator is accumulated in a hydraulic accumulator device.

MODES FOR CARRYING OUT THE INVENTION

A work machine according to embodiments of the present invention will be described with reference to the drawings. In the present embodiments, description will be made about an example in which the work machine is a hydraulic excavator of a crawler type. The work machine executes work such as civil engineering work, construction work, demolition work, or dredging work at a work site.

First Embodiment

Figure 1:
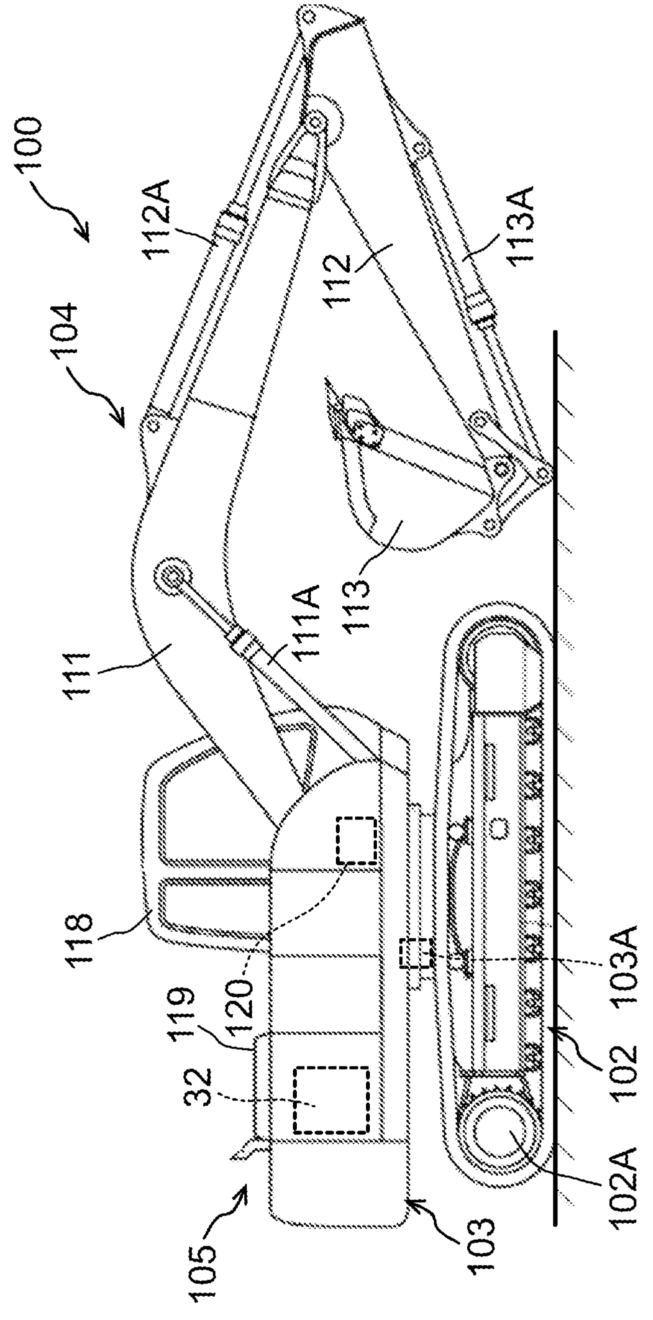
FIG. 1 is a side view of a hydraulic excavator according to a first embodiment.

FIG. 1 is a side view of a hydraulic excavator 100 according to a first embodiment. As illustrated in FIG. 1, the hydraulic excavator 100 includes a machine body 105 and a work device 104 attached to the machine body 105. The machine body 105 has a track structure 102 of a crawler type and a swing structure 103 swingably disposed over the track structure 102. The track structure 102 travels by a pair of left and right crawlers being driven by travelling motors 102A. The swing structure 103 is joined to the track structure 102 with the interposition of a swing device having a swing motor 103A and is driven by the swing motor 103A to swing relative to the track structure 102.

The swing structure 103 includes a cab 118 in which an operator rides and an engine chamber 119 in which an engine 32 that is a prime mover and pieces of hydraulic equipment such as hydraulic pumps driven by the engine 32 are housed.

In the cab 118, electrical operation devices for operating hydraulic actuators (111A, 112A, 113A, 103A, and 102A) of the work device 104, the swing structure 103, and the track structure 102 are disposed. Furthermore, a controller 120 that controls operation of the respective parts of the hydraulic excavator 100 is disposed in the cab 118.

The work device 104 is an articulated work device attached to the swing structure 103 and has a plurality of hydraulic actuators and a plurality of driving-target members driven by the plurality of hydraulic actuators. The work device 104 is a configuration in which three driving-target members (boom 111, arm 112, and bucket 113) are joined in series. A base end part of the boom 111 is pivotally joined to a front part of the swing structure 103 with the interposition of a boom pin. A base end part of the arm 112 is pivotally joined to a tip part of the boom 111 with the interposition of an arm pin. The bucket 113 is pivotally joined to a tip part of the arm 112 with the interposition of a bucket pin.

The boom 111 is rotationally driven by extension/contraction action of the boom cylinder 111A that is a hydraulic actuator (hydraulic cylinder). The arm 112 is rotationally driven by extension/contraction action of the arm cylinder 112A that is a hydraulic actuator (hydraulic cylinder). The bucket 113 is rotationally driven by extension/contraction action of the bucket cylinder 113A that is a hydraulic actuator (hydraulic cylinder). The hydraulic excavator 100 can execute excavation work of earth and sand, leveling work, compaction work for compacting a ground surface, and so forth by operating the work device 104.

Figure 2:
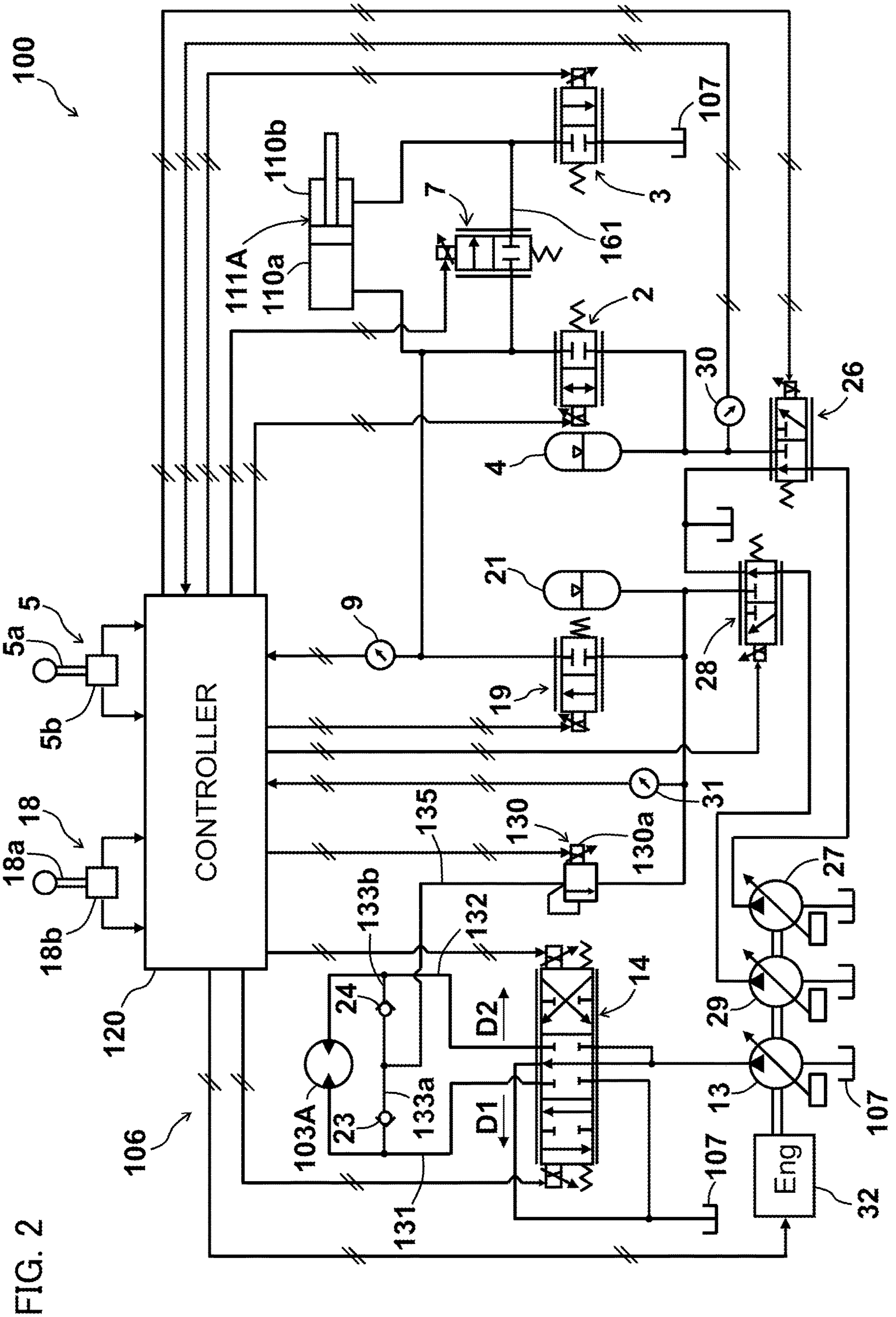
FIG. 2 is a diagram illustrating a hydraulic system included in the hydraulic excavator according to the first embodiment.

FIG. 2 is a diagram illustrating a hydraulic system 106 that the hydraulic excavator 100 according to the first embodiment includes. In FIG. 2, illustration is made regarding a configuration for driving the swing motor 103A and the boom cylinder 111A that are hydraulic actuators, and illustration is omitted regarding a configuration for driving the other hydraulic actuators.

The hydraulic system 106 includes a first hydraulic pump 13, a second hydraulic pump 27, a third hydraulic pump 29, the swing motor 103A that is a hydraulic motor driven by a hydraulic operating fluid as a working fluid supplied from the first hydraulic pump 13, the boom cylinder 111A driven to extend by the hydraulic operating fluid supplied from a low-pressure accumulator 4 or a high-pressure accumulator 21, the low-pressure accumulator 4 that accumulates a pressurized fluid discharged from the boom cylinder 111A, and the high-pressure accumulator 21 that accumulates the pressurized fluid discharged from the swing motor 103A.

Furthermore, the hydraulic system 106 includes a directional control valve 14 that is a control valve that controls the flow of the hydraulic operating fluid supplied from the first hydraulic pump 13 to the swing motor 103A, a first boom control valve 2 that is a control valve that controls the flow rate of the hydraulic operating fluid supplied from the low-pressure accumulator 4 to a bottom-side fluid chamber 110*a* of the boom cylinder 111A when the pressure of the bottom-side fluid chamber 110*a* of the boom cylinder 111A is in a low-state, and a second boom control valve 19 that is a control valve that controls the flow rate of the hydraulic operating fluid supplied from the high-pressure accumulator 21 to the bottom-side fluid chamber 110*a* of the boom cylinder 111A when the pressure of the bottom-side fluid chamber 110*a* of the boom cylinder 111A is in a high-state.

Moreover, the hydraulic system 106 includes a first hydraulic accumulation control valve 26 that is a control valve that controls the flow of the hydraulic operating fluid supplied from the second hydraulic pump 27 to the low-pressure accumulator 4, a second hydraulic accumulation control valve 28 that is a control valve that controls the flow of the hydraulic operating fluid supplied from the third hydraulic pump 29 to the high-pressure accumulator 21, a differential pressure control valve 130 that is a control valve that is disposed between the swing motor 103A and the high-pressure accumulator 21 and generates a differential pressure across the differential pressure control valve 130 that is the difference between the pressure on the side of the swing motor 103A and the pressure on the side of the high-pressure accumulator 21, and a tank 107 that stores the hydraulic operating fluid.

The first hydraulic pump 13, the second hydraulic pump 27, and the third hydraulic pump 29 are connected to the engine 32. The first to third hydraulic pumps 13, 27, and 29 are driven by the engine 32, suck up the hydraulic operating fluid from the tank 107, and deliver the hydraulic operating fluid as the pressurized fluid. The first to third hydraulic pumps 13, 27, and 29 are each a hydraulic pump of the variable displacement type. The engine 32 is a power source of the hydraulic excavator 100 and is configured by an internal combustion engine such as a diesel engine for example.

The low-pressure accumulator 4 is a hydraulic accumulator device that accumulates the hydraulic operating fluid that is discharged from the bottom-side fluid chamber 110*a* of the boom cylinder 111A and is introduced through the first boom control valve 2 at the time of contraction of the boom cylinder 111A. That is, the low-pressure accumulator 4 accumulates the pressurized fluid discharged from the boom cylinder 111A (hereinafter, described also as return fluid). The low-pressure accumulator 4 supplies the accumulated pressurized fluid to the bottom-side fluid chamber 110*a* of the boom cylinder 111A through the first boom control valve 2 at the time of extension of the boom cylinder 111A.

The high-pressure accumulator 21 is a hydraulic accumulator device that accumulates the hydraulic operating fluid at a pressure exceeding the swing brake pressure that is discharged from the swing motor 103A and is introduced through the differential pressure control valve 130 at the time of left swing braking or right swing braking of the swing motor 103A. That is, the high-pressure accumulator 21 accumulates the pressurized fluid discharged from the swing motor 103A (hereinafter, described also as return fluid). The high-pressure accumulator 21 supplies the accumulated pressurized fluid to the bottom-side fluid chamber 110*a* of the boom cylinder 111A through the second boom control valve 19 at the time of extension of the boom cylinder 111A.

The set pressure (upper-limit pressure) of the high-pressure accumulator 21 is higher than the set pressure (upper-limit pressure) of the low-pressure accumulator 4. The reason for this is because the swing brake pressure of the swing motor 103A is higher than the pressure of the bottom-side fluid chamber 110*a* of the boom cylinder 111A. When the return fluid from the hydraulic actuator is recovered by the accumulator, it is preferable to recover the return fluid by the accumulator with a set pressure close to the pressure of the return fluid because pressure loss between the accumulator and the hydraulic actuator becomes low. In the present embodiment, by recovering the return fluid from the swing motor 103A by the high-pressure accumulator 21 and recovering the return fluid from the bottom-side fluid chamber 110*a* of the boom cylinder 111A by the low-pressure accumulator 4, pressure loss between the hydraulic actuator and the accumulator can be suppressed to be low and the energy can be efficiently recovered.

A bottom-side line connected to the bottom-side fluid chamber 110*a* of the boom cylinder 111A and a rod-side line connected to a rod-side fluid chamber 110*b* of the boom cylinder 111A are made to communicate with each other through a communication line 161. On the communication line 161, a communication control valve 7 that raises the pressure of the bottom-side fluid chamber 110*a* and the rod-side fluid chamber 110*b* of the boom cylinder 111A by causing the bottom-side fluid chamber 110*a* and the rod-side fluid chamber 110*b* to communicate with each other at the time of boom lowering operation.

On a discharge line that introduces the hydraulic operating fluid of the rod-side fluid chamber 110*b* of the boom cylinder 111A to the tank 107, a discharge control valve 3 that is a control valve that controls the flow of the hydraulic operating fluid discharged from the rod-side fluid chamber 110*b* of the boom cylinder 111A to the tank 107 is disposed.

To a first swing line 131 and a second swing line 132 connected to the swing motor 103A, a first branch line 133*a* and a second branch line 133*b*, respectively, are connected. The first branch line 133*a* and the second branch line 133*b* join and are connected to a recovery line 135 for introducing the hydraulic operating fluid from the swing motor 103A to the high-pressure accumulator 21. A check valve 23 that permits only the flow of the hydraulic operating fluid from the first swing line 131 to the recovery line 135 is disposed on the first branch line 133*a*. A check valve 24 that permits only the flow of the hydraulic operating fluid from the second swing line 132 to the recovery line 135 is disposed on the second branch line 133*b*. The check valves 23 and 24 send the hydraulic operating fluid of the line on the higher pressure side in the first swing line 131 and the second swing line 132 to the differential pressure control valve 130.

The differential pressure control valve 130 that functions as a holding valve for holding the swing brake pressure is disposed on the recovery line 135 connected to the high-pressure accumulator 21. The differential pressure control valve 130, the directional control valve 14, the first hydraulic accumulation control valve 26, the second hydraulic accumulation control valve 28, the first boom control valve 2, the second boom control valve 19, the communication control valve 7, and the discharge control valve 3 are controlled by a control signal (control current) output from the controller 120.

Figure 3:
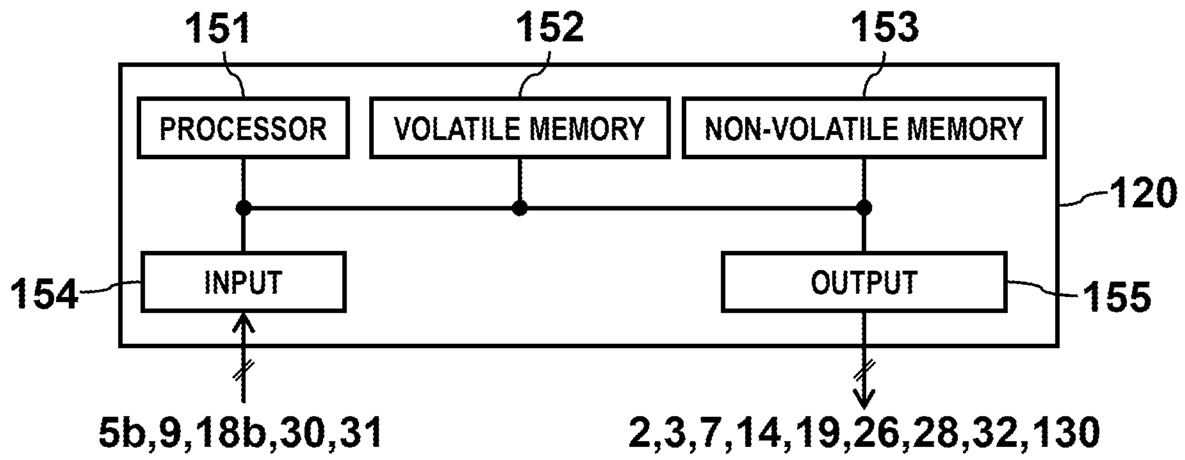
FIG. 3 is a hardware configuration diagram of a controller.

FIG. 3 is a hardware configuration diagram of the controller 120. As illustrated in FIG. 3, the controller 120 is configured by a computer including a processor 151 such as a CPU (Central Processing Unit), MPU (Micro Processing Unit), or DSP (Digital Signal Processor), a volatile memory 152 referred to as a so-called RAM (Random Access Memory), a non-volatile memory 153 such as a ROM (Read Only Memory), flash memory, or hard disk drive, an input interface 154, an output interface 155, and other peripheral circuits. The controller 120 may be configured by one computer or may be configured by a plurality of computers.

A program that allows execution of various kinds of computation is stored in the non-volatile memory 153. That is, the non-volatile memory 153 is a storage medium that can read a program that implements functions of the present embodiment. The processor 151 is a processing device that loads the program stored in the non-volatile memory 153 into the volatile memory 152 and executes computation. The processor 151 executes predetermined computation processing for signals taken in from the input interface 154, the volatile memory 152, and the non-volatile memory 153 in accordance with the program.

The input interface 154 converts signals input from the respective sensors (5*b*, 9, 18*b*, 30, and 31) and so forth to data that can be computed by the processor 151. Furthermore, the output interface 155 generates a signal for output according to a computation result in the processor 151 and outputs the signal to the respective control valves (2, 3, 7, 14, 19, 26, 28, and 130), the engine 32, and so forth.

As illustrated in FIG. 2, a boom operation device 5 and a swing operation device 18 are connected to the controller 120. The boom operation device 5 is an operation device that makes an instruction of raising operation and lowering operation of the boom 111 in response to operation by an operator. The boom operation device 5 has an operation lever (operation member) 5*a* that allows tilt operation and an operation sensor 5*b* that outputs an operation signal according to the operation amount (operation angle) of the operation lever 5*a* to the controller 120. The swing operation device 18 is an operation device that makes an instruction of left swing operation and right swing operation of the swing structure 103 in response to operation by the operator. The swing operation device 18 has an operation lever (operation member) 18*a* that allows tilt operation and an operation sensor 18*b* that outputs an operation signal according to the operation amount (operation angle) of the operation lever 18*a* to the controller 120.

The bottom pressure sensor 9, the first pressure sensor 30, and the second pressure sensor 31 are connected to the controller 120. The bottom pressure sensor 9 is a pressure sensor that senses the pressure of the hydraulic operating fluid in the bottom-side fluid chamber 110*a* of the boom cylinder 111A and outputs the sensing result to the controller 120. The first pressure sensor 30 is a pressure sensor that senses the pressure of the hydraulic operating fluid in the low-pressure accumulator 4 and outputs the sensing result to the controller 120. The second pressure sensor 31 is a pressure sensor that senses the pressure of the hydraulic operating fluid in the high-pressure accumulator 21 and outputs the sensing result to the controller 120.

The controller 120 determines whether or not the pressure sensed by the first pressure sensor 30 is lower than a low-pressure lower-limit-side threshold. When determining that the pressure sensed by the first pressure sensor 30 is lower than the low-pressure lower-limit-side threshold, the controller 120 causes the second hydraulic pump 27 to communicate with the low-pressure accumulator 4 by the first hydraulic accumulation control valve 26 and accumulates the hydraulic operating fluid delivered from the second hydraulic pump 27 in the low-pressure accumulator 4. When determining that the pressure sensed by the first pressure sensor 30 is equal to or higher than a low-pressure upper-limit-side threshold, the controller 120 interrupts the communication between the second hydraulic pump 27 and the low-pressure accumulator 4 by the first hydraulic accumulation control valve 26. A value equal to or larger than the low-pressure lower-limit-side threshold is set as the low-pressure upper-limit-side threshold in advance. The low-pressure upper-limit-side threshold and the low-pressure lower-limit-side threshold are stored in the non-volatile memory 153.

The controller 120 determines whether or not the pressure sensed by the second pressure sensor 31 is lower than a high-pressure lower-limit-side threshold. When determining that the pressure sensed by the second pressure sensor 31 is lower than the high-pressure lower-limit-side threshold, the controller 120 causes the third hydraulic pump 29 to communicate with the high-pressure accumulator 21 by the second hydraulic accumulation control valve 28 and accumulates the hydraulic operating fluid delivered from the third hydraulic pump 29 in the high-pressure accumulator 21. When determining that the pressure sensed by the second pressure sensor 31 is equal to or higher than a high-pressure upper-limit-side threshold, the controller 120 interrupts the communication between the third hydraulic pump 29 and the high-pressure accumulator 21 by the second hydraulic accumulation control valve 28. A value equal to or larger than the high-pressure lower-limit-side threshold is set as the high-pressure upper-limit-side threshold in advance. The high-pressure upper-limit-side threshold and the high-pressure lower-limit-side threshold are stored in the non-volatile memory 153.

The controller 120 causes operation of the boom 111 by controlling the control valves (2, 3, 7, and 19) on the basis of the operation signal from the operation sensor 5*b* of the boom operation device 5 and the sensing result of the bottom pressure sensor 9.

The contents of control for causing lowering operation of the boom 111 by the controller 120 will be described below. When the operation lever 5*a* of the boom operation device 5 is operated in the lowering direction, a boom lowering operation signal is output from the operation sensor 5*b* to the controller 120. The controller 120 opens the communication control valve 7 and causes the bottom-side fluid chamber 110*a* and the rod-side fluid chamber 110*b* of the boom cylinder 111A to communicate with each other to raise the pressure of the bottom-side fluid chamber 110*a* and the rod-side fluid chamber 110*b*.

A pressure Pbc of the bottom-side fluid chamber 110*a* after the opening of the communication control valve 7 is represented by the following expression where the pressure receiving area of the bottom-side fluid chamber 110*a* is defined as Ab, the pressure receiving area of the rod-side fluid chamber 110*b* is defined as Ar, and the pressure of the bottom-side fluid chamber 110*a* before the opening of the communication control valve 7 is defined as Pb.

$$Pbc = Ab/(Ab - Ar) \times Pb$$

Therefore, for example, when the pressure receiving area Ab of the bottom-side fluid chamber 110*a* is twice the pressure receiving area Ar of the rod-side fluid chamber 110*b*, the pressure of the bottom-side fluid chamber 110*a* after opening of the communication control valve 7 rises to twice the pressure of the bottom-side fluid chamber 110*a* before the opening of the communication control valve 7. The controller 120 can adjust the degree of the pressure rise of the bottom-side fluid chamber 110*a* by adjusting the opening degree of the communication control valve 7.

Furthermore, the controller 120, when the boom lowering operation signal is input thereto, opens the first boom control valve 2 and accumulates the return fluid from the bottom-side fluid chamber 110*a* of the boom cylinder 111A in the low-pressure accumulator 4. The hydraulic operating fluid of the bottom-side fluid chamber 110*a* is introduced to the rod-side fluid chamber 110*b* through the communication control valve 7 and is introduced to the low-pressure accumulator 4 through the first boom control valve 2. Due to this, the boom cylinder 111A contracts and the boom 111 pivots in the downward direction. As described above, the bottom-side fluid chamber 110*a* communicates with the rod-side fluid chamber 110*b* by the communication control valve 7 and the pressure of the bottom-side fluid chamber 110*a* is raised. This improves the efficiency of recovery of energy by the low-pressure accumulator 4.

The contents of control for causing raising operation of the boom 111 by the controller 120 will be described below. When the operation lever 5*a* of the boom operation device 5 is operated in the raising direction, a boom raising operation signal is output from the operation sensor 5*b* to the controller 120. The controller 120 determines whether or not the pressure sensed by the bottom pressure sensor 9 is lower than a pressure threshold. The pressure threshold may be a constant set in advance, or a variable that becomes larger when the pressure sensed by the first pressure sensor 30 is higher may be employed.

The controller 120 opens the first boom control valve 2 and the discharge control valve 3 when determining that the pressure sensed by the bottom pressure sensor 9 is lower than the pressure threshold, that is, when the bottom-side fluid chamber 110*a* is in a low-pressure state. Due to this, the pressurized fluid delivered from the low-pressure accumulator 4 is supplied to the bottom-side fluid chamber 110*a* and the hydraulic operating fluid is discharged from the rod-side fluid chamber 110*b* to the tank 107. As a result, the boom cylinder 111A extends and the boom 111 pivots in the upward direction.

The controller 120 opens the second boom control valve 19 and the discharge control valve 3 when determining that the pressure sensed by the bottom pressure sensor 9 is equal to or higher than the pressure threshold, that is, when the bottom-side fluid chamber 110*a* is in a high-pressure state. Due to this, the pressurized fluid delivered from the high-pressure accumulator 21 is supplied to the bottom-side fluid chamber 110*a*, and the hydraulic operating fluid is discharged from the rod-side fluid chamber 110*b* to the tank 107. As a result, the boom cylinder 111A extends and the boom 111 pivots in the upward direction.

As above, the controller 120 drives the boom cylinder 111A by the low-pressure accumulator 4 when the bottom-side fluid chamber 110*a* is in a low-pressure state, and drives the boom cylinder 111A by the high-pressure accumulator 21 when the bottom-side fluid chamber 110*a* is in a high-pressure state. This can reduce pressure loss between the boom cylinder 111A and the accumulator that drives the boom cylinder 111A. Thus, according to the present embodiment, the boom cylinder 111A can be efficiently driven.

The pressure of the low-pressure accumulator 4 is kept constant due to supply of the hydraulic operating fluid from the second hydraulic pump 27, and the pressure of the high-pressure accumulator 21 is kept constant due to supply of the hydraulic operating fluid from the third hydraulic pump 29. Thus, the boom cylinder 111A can be driven to extend by opening the first boom control valve 2 or the second boom control valve 19 at an optional timing.

The controller 120 causes operation of the swing structure 103 by controlling the directional control valve 14 on the basis of the operation signal from the operation sensor 18*b* of the swing operation device 18.

The contents of control for causing swing operation of the swing structure 103 by the controller 120 will be described below. When the operation lever 18*a* of the swing operation device 18 is operated, a swing operation signal is output from the operation sensor 18*b* to the controller 120. The controller 120 determines whether left swing operation of the operation lever 18*a* has been executed or right swing operation thereof has been executed based on the swing operation signal.

The controller 120, when determining that left swing operation of the operation lever 18*a* has been executed, outputs a control current according to the operation amount of the operation lever 18*a* to a first solenoid of the directional control valve 14 and drives a spool of the directional control valve 14 in a first direction D1. Due to this, the hydraulic operating fluid delivered from the first hydraulic pump 13 is supplied to the swing motor 103A through the directional control valve 14 and the first swing line 131, and the swing motor 103A rotates in a forward direction. The return oil from the swing motor 103A is discharged to the tank 107 through the second swing line 132 and the directional control valve 14. This causes the swing structure 103 to swing in the left direction.

The controller 120, when determining that right swing operation of the operation lever 18*a* has been executed, outputs the control current according to the operation amount of the operation lever 18*a* to a second solenoid of the directional control valve 14, and drives the spool of the directional control valve 14 in a second direction D2 opposite to the first direction D1. Due to this, the hydraulic operating fluid delivered from the first hydraulic pump 13 is supplied to the swing motor 103A through the directional control valve 14 and the second swing line 132, and the swing motor 103A rotates in the direction opposite to the forward direction. The return oil from the swing motor 103A is discharged to the tank 107 through the second swing line 132 and the directional control valve 14. This causes the swing structure 103 to swing in the right direction.

If the operation lever 18*a* is returned to the neutral position when the swing structure 103 is swinging, the spool of the directional control valve 14 returns to the neutral position. When the spool of the directional control valve 14 returns to the neutral position, an actuator port of the directional control valve 14 is closed. That is, the supply of the hydraulic operating fluid to the swing motor 103A through the directional control valve 14 and the discharge of the hydraulic operating fluid from the swing motor 103A through the directional control valve 14 are interrupted.

This causes a rise in the pressure of the line through which the hydraulic operating fluid is discharged from the swing motor 103A (hereinafter, referred to also as high-pressure-side line) in the first swing line 131 and the second swing line 132. Due to the rise in the back pressure of the swing motor 103A, that is, the pressure of the high-pressure-side line, a brake force that decreases the swing velocity of the swing structure 103 acts on the swing motor 103A. That is, the pressure of the high-pressure-side line acts on the swing motor 103A as the brake pressure. When the pressure of the high-pressure-side line exceeds a set differential pressure of the differential pressure control valve 130, the hydraulic operating fluid is introduced from the high-pressure-side line to the high-pressure accumulator 21 through the differential pressure control valve 130, and hydraulic accumulation of the high-pressure accumulator 21 is caused. Therefore, in the hydraulic system 106 of the present embodiment, while the necessary brake force is ensured, the return fluid from the swing motor 103A can be sent to the high-pressure accumulator 21 and recovery of energy can be executed.

The differential pressure control valve 130 is closed when the difference between the back pressure of the swing motor 103A, which is the pressure on the upstream side of itself, and the pressure of the high-pressure accumulator 21, which is the pressure on the downstream side of itself (that is, differential pressure across the differential pressure control valve 130), is equal to or lower than the set differential pressure. The differential pressure control valve 130 is opened when this difference exceeds the set differential pressure. The differential pressure control valve 130 is a solenoid proportional pressure control valve that can change the set differential pressure according to a control current that is output by the controller 120 and is supplied to a solenoid 130*a*. The set differential pressure of the differential pressure control valve 130 is adjusted according to the control current output from the controller 120. The controller 120 controls the differential pressure control valve 130 on the basis of the sensing result of the second pressure sensor 31.

The differential pressure control valve 130 has a configuration similar to a well-known solenoid proportional relief valve and, for example, has a poppet that is a valve body, a rod fixed to a moving core of the solenoid 130*a*, and a spring disposed between the rod and the poppet. The spring biases the poppet in such a direction as to press the poppet against the valve seat. When the control current that flows to the solenoid 130*a* increases, the rod moves together with the moving core, the spring between the poppet and the rod is compressed, and the set differential pressure increases. A biasing force of the spring, a thrust force of the solenoid 130*a*, and the pressure on the downstream side act on the poppet in such a direction as to press the poppet against the valve seat.

Figure 4:
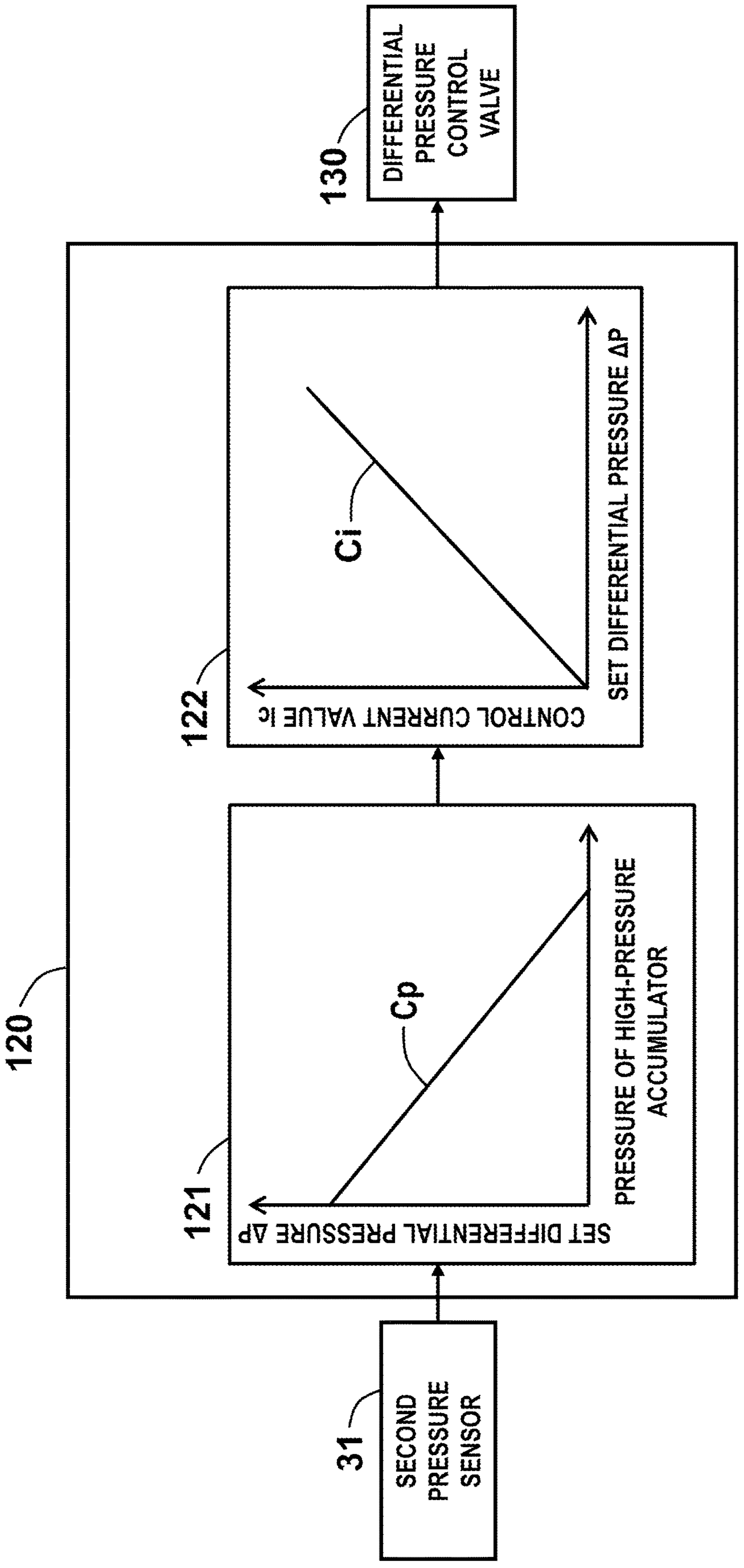
FIG. 4 is a block diagram illustrating control of a differential pressure control valve by the controller according to the first embodiment.

An adjustment method of the set differential pressure of the differential pressure control valve 130 by the controller 120 will be described in detail with reference to FIG. 4. The controller 120 reduces the set differential pressure of the differential pressure control valve 130 according to a rise in the pressure of the high-pressure accumulator 21 sensed by the second pressure sensor 31. That is, the controller 120 controls the differential pressure control valve 130 in such a manner that the differential pressure across the differential pressure control valve 130 reduces according to a rise in the pressure of the high-pressure accumulator 21 sensed by the second pressure sensor 31. FIG. 4 is a block diagram illustrating the control of the differential pressure control valve 130 by the controller 120 according to the first embodiment. As illustrated in FIG. 4, the controller 120 functions as a differential pressure computing section 121 and an output converting section 122 through execution of a program stored in the non-volatile memory 153.

The differential pressure computing section 121 refers to a differential pressure characteristic Cp stored in the non-volatile memory 153 in advance, and computes a set differential pressure AP of the differential pressure control valve 130 on the basis of the pressure of the high-pressure accumulator 21 sensed by the second pressure sensor 31. The differential pressure characteristic Cp is a characteristic in which the set differential pressure AP of the differential pressure control valve 130 decreases as the pressure of the high-pressure accumulator 21 increases, and, for example, is stored in the non-volatile memory 153 in a table format.

The differential pressure characteristic Cp is set in advance in such a manner that the brake pressure of the swing motor 103A, which is the pressure on the upstream side of the differential pressure control valve 130, is kept constant even when the pressure of the high-pressure accumulator 21 changes. For example, in the case in which the brake pressure of the swing motor 103A is set to 30 MPa, the differential pressure becomes 10 MPa when the pressure of the high-pressure accumulator 21 is 20 MPa, and the differential pressure becomes 9 MPa when the pressure of the high-pressure accumulator 21 is 21 MPa.

The output converting section 122 refers to a control current characteristic Ci stored in the non-volatile memory 153 in advance, and computes a control current value Ic supplied to the solenoid 130*a* of the differential pressure control valve 130 on the basis of the set differential pressure ΔP computed in the differential pressure computing section 121. The output converting section 122 outputs the control current according to the computation result to the solenoid 130*a* of the differential pressure control valve 130. The control current characteristic Ci is a characteristic in which the control current value Ic increases as the set differential pressure ΔP increases.

Main operation of the hydraulic excavator 100 according to the first embodiment will be described. For example, an operator operates the operation lever 18*a* of the swing operation device 18 illustrated in FIG. 2 in the left swing direction to cause left swing of the swing structure 103. Thereafter, when the operator returns the operation lever 18*a* of the swing operation device 18 to the neutral position, the spool of the directional control valve 14 returns to the neutral position. Due to this, supply of the hydraulic operating fluid to the swing motor 103A through the directional control valve 14 and the first swing line 131 is interrupted. In addition, discharge of the hydraulic operating fluid through the second swing line 132 and the directional control valve 14 is interrupted. As a result, the pressure of the second swing line 132 rises. When the pressure of the second swing line 132 rises and the differential pressure across the differential pressure control valve 130 exceeds the set differential pressure ΔP, the differential pressure control valve 130 opens. When the differential pressure control valve 130 opens, the hydraulic operating fluid of the second swing line 132 passes through the check valve 24 on the second branch line 133*b* and the differential pressure control valve 130 on the recovery line 135, and is introduced to the high-pressure accumulator 21. The differential pressure control valve 130 operates in such a manner that the differential pressure across it is kept at the set differential pressure ΔP.

Here, as a comparative example of the present embodiment, the case will be described in which a control valve about which the set differential pressure is settled at a constant value by a spring force is disposed instead of the differential pressure control valve 130. This control valve does not have the solenoid 130*a*. In this comparative example, when the pressure of the high-pressure accumulator 21 rises, the pressure on the side of the swing motor 103A also rises. In the comparative example, the brake force changes depending on the pressure of the high-pressure accumulator 21. Thus, there is a possibility that operation of the swing motor 103A becomes unstable. As a result, there is a possibility that it is impossible to implement operability desired by the operator in the comparative example.

In contrast, in the differential pressure control valve 130 according to the present embodiment, the set differential pressure ΔP is determined by the spring force and the solenoid thrust force generated according to the control current. As described above, the set differential pressure ΔP of the differential pressure control valve 130 becomes lower as the pressure of the high-pressure accumulator 21 increases. Due to this, change in the back pressure of the swing motor 103A, that is, the brake pressure, can be made small. That is, according to present embodiment, the brake force of the swing motor 103A can be stably generated even when the pressure of the high-pressure accumulator 21 changes. Therefore, deceleration operation of the swing structure 103 is stabilized. As a result, in the present embodiment, operability desired by the operator can be implemented.

In the accumulator, pressure variation becomes larger when the capacity thereof is lower. Thus, if the size of the high-pressure accumulator 21 is reduced in the comparative example of the present embodiment, pressure variation of the high-pressure accumulator 21 becomes large, and thus it becomes more difficult to generate the stable brake pressure. In contrast, according to the present embodiment, even when the size of the high-pressure accumulator 21 is reduced, the stable brake pressure can be generated because the set differential pressure of the differential pressure control valve 130 changes in response to pressure variation of the high-pressure accumulator 21. That is, according to the present embodiment, it is also possible to intend reduction in the cost through size reduction of the high-pressure accumulator 21 and improvement in the mountability through size reduction of the high-pressure accumulator 21.

According to the above-described embodiment, the following operation and effects are provided.

(1) The hydraulic excavator (work machine) 100 includes the engine 32, the first hydraulic pump (hydraulic pump) 13 that is driven by the engine 32 and delivers the pressurized fluid, the swing motor (hydraulic actuator) 103A that is operated by the pressurized fluid delivered by the first hydraulic pump 13, the high-pressure accumulator (hydraulic accumulator device) 21 that accumulates the pressurized fluid discharged from the swing motor 103A, the differential pressure control valve 130 that is disposed between the swing motor 103A and the high-pressure accumulator 21 and generates the differential pressure across the differential pressure control valve 130 between the pressure of the swing motor 103A and the pressure of the high-pressure accumulator 21, the second pressure sensor (pressure sensor) 31 that senses the pressure of the high-pressure accumulator 21, and the controller 120 that controls the differential pressure control valve 130 on the basis of the sensing result of the second pressure sensor 31. The controller 120 controls the differential pressure control valve 130 in such a manner that the above-described differential pressure across the differential pressure control valve 130 reduces according to a rise in the pressure of the high-pressure accumulator 21 sensed by the second pressure sensor 31.

According to the above-described configuration, the differential pressure across the differential pressure control valve 130 is reduced according to a rise in the pressure of the high-pressure accumulator 21 and thus change in the brake pressure, which is the pressure on the downstream side of the swing motor 103A, is suppressed. That is, a stable brake force can be generated in the above-described configuration. Therefore, according to the present embodiment, it is possible to provide the hydraulic excavator 100 that can allow the swing motor 103A to stably operate when the pressurized fluid discharged from the swing motor 103A is accumulated in the high-pressure accumulator 21.

(2) The differential pressure control valve 130 is configured by a solenoid proportional valve in which the set differential pressure AP is adjusted according to the control current output by the controller 120. The differential pressure control valve 130 is closed when the differential pressure across the differential pressure control valve 130 is equal to or lower than the set differential pressure ΔP, and is opened when this differential pressure exceeds the set differential pressure ΔP. The controller 120 reduces the set differential pressure ΔP of the differential pressure control valve 130 according to a rise in the pressure of the high-pressure accumulator 21 sensed by the second pressure sensor 31. In this configuration, when the difference between the pressure of the high-pressure accumulator 21 and the brake pressure, which is the pressure on the downstream side of the swing motor 103A, exceeds the set differential pressure ΔP, the differential pressure control valve 130 is opened and a rise in the brake pressure is suppressed.

Second Embodiment

A hydraulic excavator 200 according to a second embodiment will be described with reference to FIG. 5 and FIG. 6. A configuration that is the same as or equivalent to the configuration described in the first embodiment is given the same reference numeral and differences will be mainly described.

To the swing structure 103 of the hydraulic excavator 200 according to the second embodiment, an angular velocity sensor 33 such as a gyroscope that senses the angular velocity of the swing structure 103 is attached. The angular velocity sensor 33 is connected to a controller 220 and outputs a sensing result to the controller 220. The controller 220 according to the second embodiment controls a differential pressure control valve 230 in such a manner that the opening area of the differential pressure control valve 230 becomes large according to a rise in the pressure of the high-pressure accumulator 21 sensed by the second pressure sensor 31. Furthermore, the controller 220 controls the differential pressure control valve 230 in such a manner that the opening area of the differential pressure control valve 230 becomes larger when the angular velocity of a swing sensed by the angular velocity sensor 33 is higher.

Figure 5:
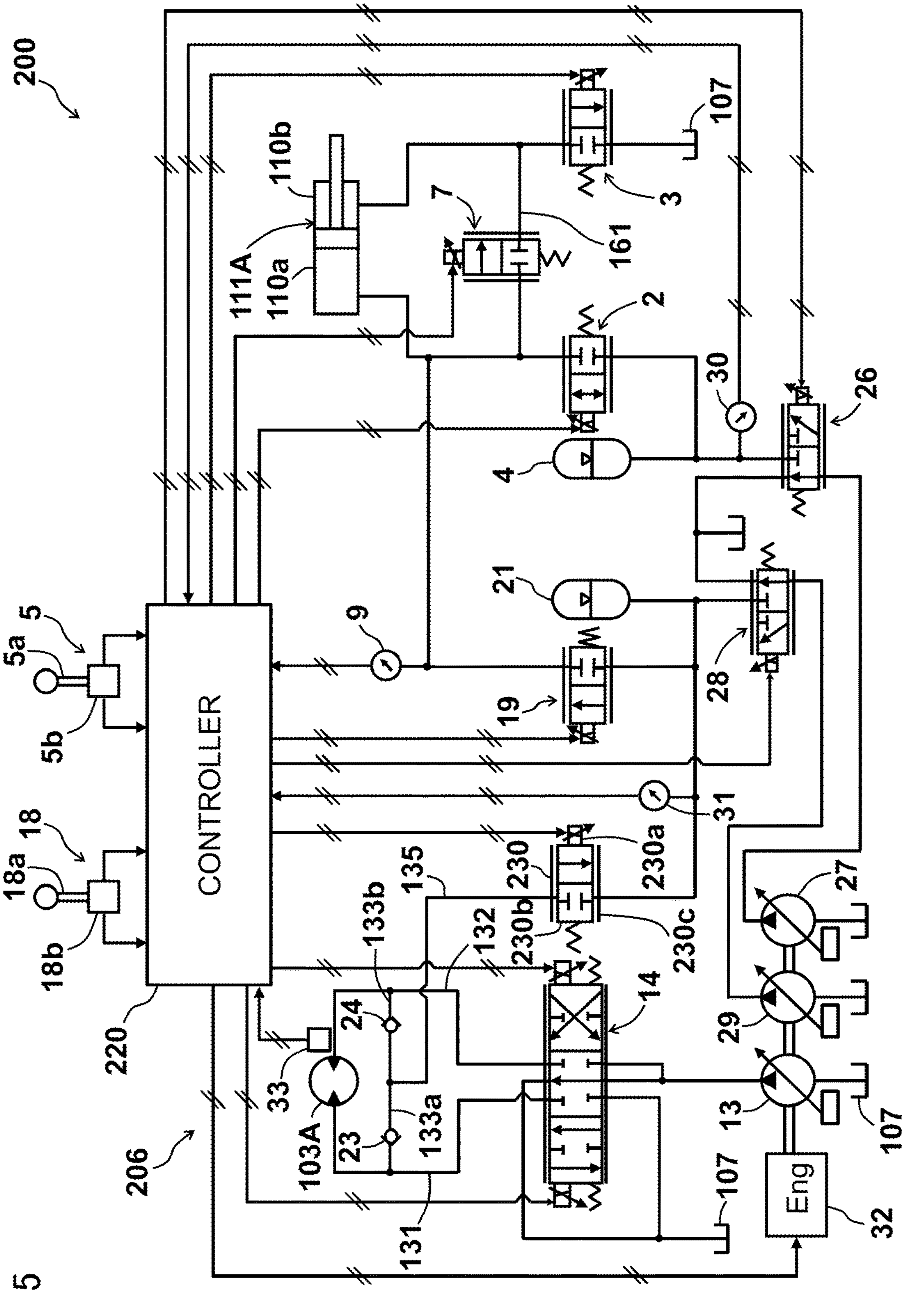
FIG. 5 is a diagram illustrating a hydraulic system included in a hydraulic excavator according to a second embodiment.
Figure 6:
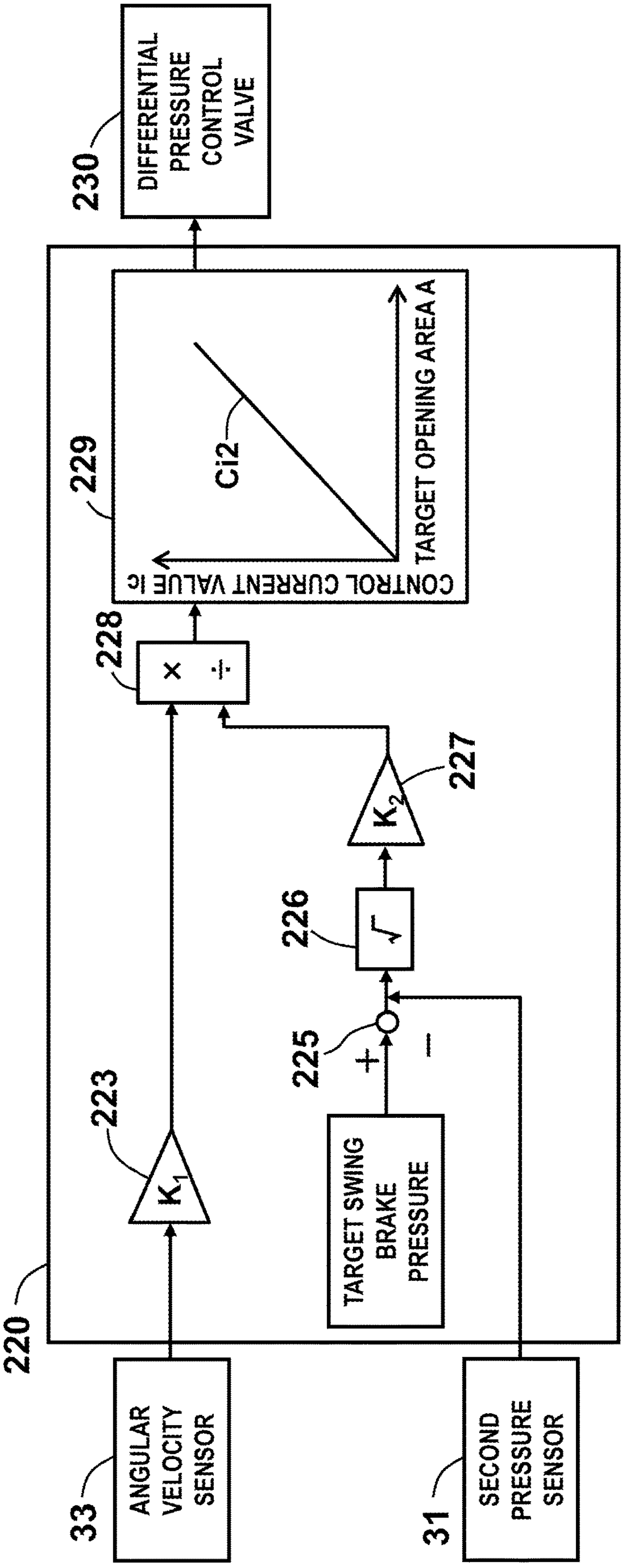
FIG. 6 is a block diagram illustrating control of a differential pressure control valve by a controller according to the second embodiment.

FIG. 5 is a diagram similar to FIG. 2 and is a diagram illustrating a hydraulic system 206 included in the hydraulic excavator 200 according to the second embodiment. In the hydraulic system 206 according to the second embodiment, the differential pressure control valve 230 that is a solenoid proportional valve of a spool type is disposed instead of the differential pressure control valve 130 described in the first embodiment.

The differential pressure control valve 230 has a spool 230*b* that is a valve body and a sleeve 230*c* that is a holding member that holds the spool 230*b*. The differential pressure control valve 230 is a control valve in which change in the area of an opening of the differential pressure control valve 230 that configures the opening of the recovery line 135 (hereinafter, referred to also as opening area of the differential pressure control valve 230) is allowed through sliding of the spool 230*b* in the sleeve 230*c* according to a control current that is output by the controller 220 and is supplied to a solenoid 230*a*. The controller 220 adjusts the opening area of the differential pressure control valve 230, that is, the sectional area of the flow line of the hydraulic operating fluid that flows from the swing motor 103A toward the high-pressure accumulator 21, by adjusting the control current supplied to the solenoid 230*a* of the differential pressure control valve 230. The controller 220 adjusts the differential pressure across the differential pressure control valve 230 by causing the opening of the differential pressure control valve 230 to function as an orifice and adjusting the opening area thereof.

The controller 220 generates a desired brake pressure by controlling the opening area of the differential pressure control valve 230 on the basis of an expression of the orifice using the flow rate of the hydraulic operating fluid discharged from the swing motor 103A and the pressure of the high-pressure accumulator 21.

The expression of the orifice is what represents the relation among the differential pressure across a restrictor, the flow rate at the restrictor, and the opening area of the restrictor in general, and can be represented as the following expression (1) when unit conversion is omitted.

$$Q=CA\sqrt{(P1-P2)} \quad \text{[Expression 1]}$$

Here, Q is the flow rate of flowing to the restrictor and A is the opening area of the restrictor. P1 is the upstream-side pressure of the orifice and P2 is the downstream-side pressure of the orifice. C is a flow rate coefficient and 0.7 is used in general.

When the expression (1) is solved regarding the opening area A, the following expression (2) is derived.

[Expression 2]

$$A = \frac{Q}{C\sqrt{(P1 - P2)}} \quad (2)$$

In the case of the present embodiment, Q is the flow rate of the hydraulic operating fluid discharged from the swing motor 103A and A is the opening area of the differential pressure control valve 230. P1 is the upstream-side pressure of the differential pressure control valve 230 and P2 is the downstream-side pressure of the differential pressure control valve 230. The flow rate Q of the hydraulic operating fluid discharged from the swing motor 103A is in a proportional relation with the angular velocity of the swing structure 103. Therefore, the flow rate Q can be calculated by multiplying the angular velocity of the swing structure 103 by a constant of proportionality (gain K1 to be described later).

The contents of control of the differential pressure control valve 230 by the controller 220 will be described in detail with reference to FIG. 6. FIG. 6 is a block diagram illustrating the control of the differential pressure control valve 230 by the controller 220 according to the second embodiment. As illustrated in FIG. 6, the controller 220 functions as a first gain multiplying section 223, a subtracting section 225, a square-root extracting section 226, a second gain multiplying section 227, a dividing section 228, and an output converting section 229 through execution of a program stored in the non-volatile memory 153.

The first gain multiplying section 223 multiplies an angular velocity ω of the swing structure 103 sensed by the angular velocity sensor 33 by the gain K1 set in advance to compute the flow rate Q of the hydraulic operating fluid discharged from the swing motor 103A ($Q=\omega \cdot K1$).

The subtracting section 225, for example, subtracts the pressure of the high-pressure accumulator 21 sensed by the second pressure sensor 31 (that is, actual measurement value of the downstream-side pressure P2 of the differential pressure control valve 230) from a target swing brake pressure that is set in advance and is stored in the non-volatile memory 153 (that is, target value of the upstream-side pressure P1 of the differential pressure control valve 230) to compute a target differential pressure (P1−P2) across the differential pressure control valve 230.

The square-root extracting section 226 computes the square root of the target differential pressure (P1−P2) across the differential pressure control valve 230 computed in the subtracting section 225. The second gain multiplying section 227 multiplies the computation result of the square-root extracting section 226 by a gain K2 set in advance. The gain K2 is equivalent to the flow rate coefficient C in the expression (2).

The dividing section 228 divides the computation result of the first gain multiplying section 223 by the computation result of the second gain multiplying section 227 to compute the opening area (referred to also as target opening area) A targeted by the differential pressure control valve 230.

The output converting section 229 refers to a control current characteristic Ci2 stored in the non-volatile memory 153 in advance and computes the control current value Ic supplied to the solenoid 230*a* of the differential pressure control valve 230 on the basis of the target opening area A computed in the dividing section 228. The output converting section 229 outputs the control current according to the computation result to the solenoid 230*a* of the differential pressure control valve 230. The control current characteristic Ci2 is a characteristic in which the control current value Ic increases as the target opening area A increases.

As above, in the present second embodiment, the differential pressure control valve 230 is configured by the solenoid proportional valve in which the opening area is adjusted according to the control current output by the controller 220. The controller 220 controls the differential pressure control valve 230 in such a manner that the opening area of the differential pressure control valve 230 becomes large according to a rise in the pressure of the high-pressure accumulator 21 sensed by the second pressure sensor 31. Furthermore, the controller 220 controls the differential pressure control valve 230 in such a manner that the opening area of the differential pressure control valve 230 becomes larger when the angular velocity of a swing of the swing structure 103 sensed by the angular velocity sensor 33 is higher. In this configuration, the opening area of the differential pressure control valve 230 becomes large according to a rise in the pressure of the high-pressure accumulator 21 and therefore a rise in the brake pressure attributed to the rise in the pressure of the high-pressure accumulator 21 is suppressed. Moreover, change in the brake pressure attributed to change in the flow rate of the swing motor 103A is also suppressed. Therefore, according to the present second embodiment, the swing motor 103A can be stably operated when the pressurized fluid discharged from the swing motor 103A is accumulated in the high-pressure accumulator 21.

The following modification examples are also within the range of the present invention and it is also possible to combine a configuration shown in the modification example and a configuration described in the above-described embodiment or combine configurations described in the above-described different embodiments or combine configurations to be described in the following different modification examples.

Modification Example 1

In the above-described embodiments, description has been made about the examples in which the controller 120 or 220 adjusts the differential pressure across the differential pressure control valve 130 or 230 disposed between the high-pressure accumulator 21 that accumulates the return fluid from the swing motor 103A that causes the swing structure 103 to swing and the swing motor 103A. However, the present invention is not limited thereto. The controllers 120 and 220 may control the opening area of the first boom control valve 2 disposed between the low-pressure accumulator 4 that accumulates the return fluid from the boom cylinder 111A and the boom cylinder 111A to adjust the differential pressure across the first boom control valve 2.

Figure 7:
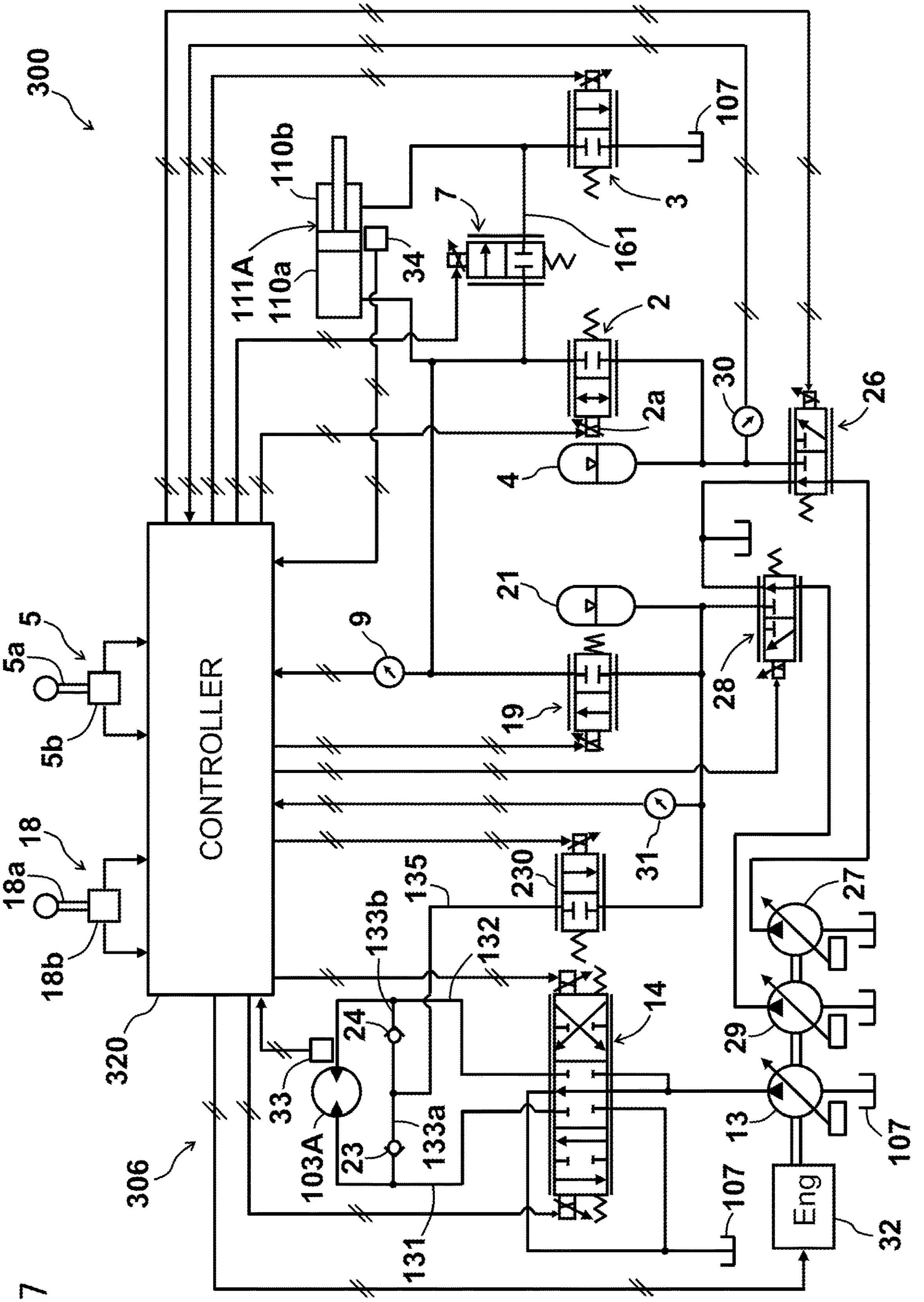
FIG. 7 is a diagram illustrating a hydraulic system included in a hydraulic excavator according to a modification example 1.
Figure 8:
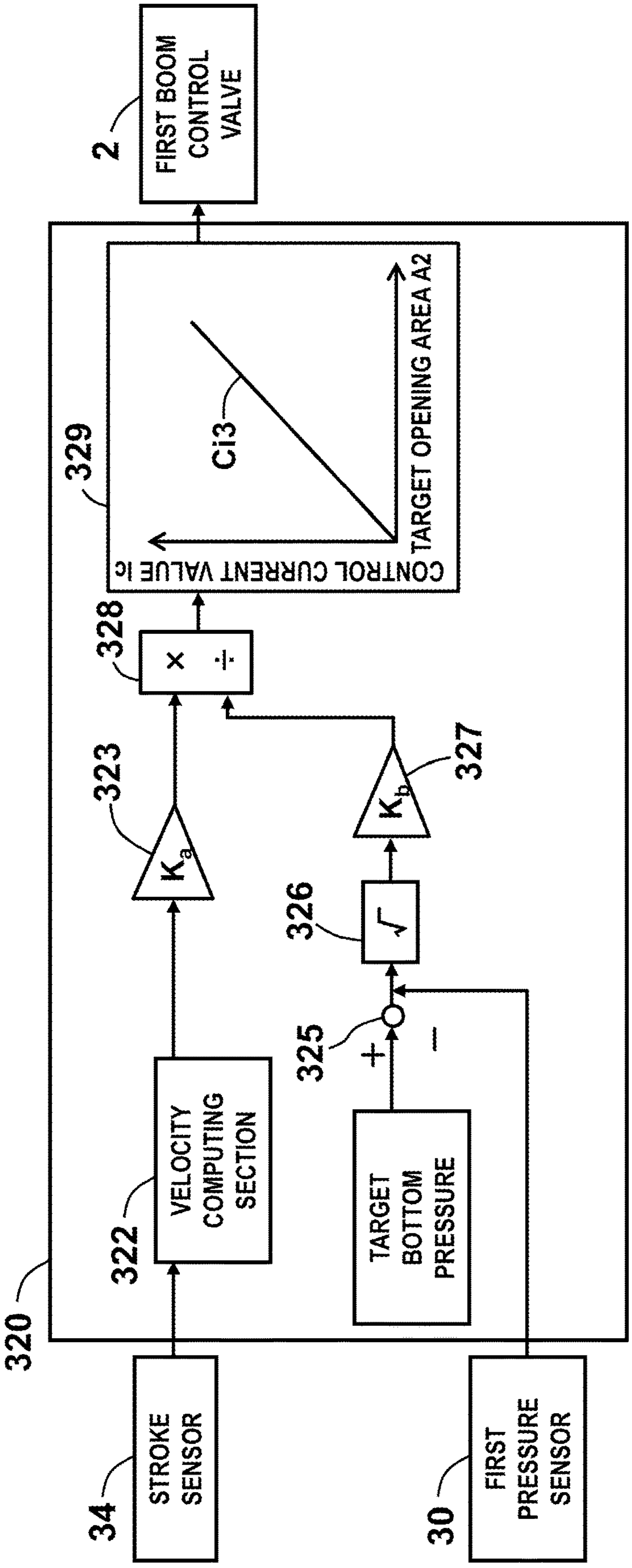
FIG. 8 is a block diagram illustrating control of a first boom control valve by a controller according to a third embodiment.

A hydraulic excavator 300 according to a present modification example 1 will be described below with reference to FIG. 7 and FIG. 8. A configuration that is the same as or equivalent to the configuration described in the second embodiment is given the same reference numeral and differences will be mainly described. FIG. 7 is a diagram similar to FIG. 2 and is a diagram illustrating a hydraulic system 306 included in the hydraulic excavator 300 according to the modification example 1.

As illustrated in FIG. 7, the boom cylinder 111A of the hydraulic excavator 300 according to the present modification example 1 is provided with a stroke sensor 34 that senses the stroke of the boom cylinder 111A. A controller 320 computes the extension/contraction velocity of the boom cylinder 111A (hereinafter, referred to also as cylinder velocity) on the basis of a sensing result of the stroke sensor 34. The first boom control valve 2 is a solenoid proportional valve of a spool type in which the opening area can be changed according to a control current that is output by the controller 320 and is supplied to a solenoid 2*a*, similarly to the differential pressure control valve 230 described in the second embodiment.

The controller 320, when a boom lowering operation signal is input thereto, opens the first boom control valve 2 and accumulates the return fluid from the bottom-side fluid chamber 110*a* of the boom cylinder 111A in the low-pressure accumulator 4. At this time, the controller 320 adjusts the opening area of the first boom control valve 2, that is, the sectional area of the flow line of the hydraulic operating fluid that flows from the boom cylinder 111A toward the low-pressure accumulator 4, by adjusting the control current supplied to the solenoid 2*a* of the first boom control valve 2. The controller 320 adjusts the differential pressure across the first boom control valve 2 by causing the opening of the first boom control valve 2 to function as an orifice and adjusting the opening area thereof.

The contents of control of the first boom control valve 2 by the controller 320 will be described in detail with reference to FIG. 8. FIG. 8 is a block diagram illustrating the control of the first boom control valve 2 by the controller 320 according to a third embodiment. As illustrated in FIG. 8, the controller 320 functions as a velocity computing section 322, a first gain multiplying section 323, a subtracting section 325, a square-root extracting section 326, a second gain multiplying section 327, a dividing section 328, and an output converting section 329 through execution of a program stored in the non-volatile memory 153.

The velocity computing section 322 computes a cylinder velocity Vs on the basis of time change of the stroke of the boom cylinder 111A sensed by the stroke sensor 34. The first gain multiplying section 323 multiplies the cylinder velocity Vs computed in the velocity computing section 322 by a gain Ka set in advance to compute the flow rate Q of the hydraulic operating fluid discharged from the bottom-side fluid chamber 110*a* of the boom cylinder 111A ($Q=Vs\cdot Ka$).

The subtracting section 325, for example, subtracts the pressure of the low-pressure accumulator 4 sensed by the first pressure sensor 30 (that is, actual measurement value of the downstream-side pressure P2 of the first boom control valve 2) from a target bottom pressure that is set in advance and is stored in the non-volatile memory 153 (that is, target value of the upstream-side pressure P1 of the first boom control valve 2) to compute a target differential pressure (P1−P2) across the first boom control valve 2.

The square-root extracting section 326 computes the square root of the target differential pressure (P1−P2) across the first boom control valve 2 computed in the subtracting section 325. The second gain multiplying section 327 multiplies the computation result of the square-root extracting section 326 by a gain Kb set in advance. The gain Kb is equivalent to the flow rate coefficient C in the expression (2).

The dividing section 328 divides the computation result of the first gain multiplying section 323 by the computation result of the second gain multiplying section 327 to compute an opening area (referred to also as target opening area) A2 targeted by the first boom control valve 2.

The output converting section 329 refers to a control current characteristic Ci3 stored in the non-volatile memory 153 in advance and computes the control current value Ic supplied to the solenoid 2*a* of the first boom control valve 2 on the basis of the target opening area A2 computed in the dividing section 328. The output converting section 329 outputs the control current according to the computation result to the solenoid 2*a* of the first boom control valve 2. The control current characteristic Ci3 is a characteristic in which the control current value Ic increases as the target opening area A2 increases.

As above, in the present modification example, the first boom control valve 2 functions as a differential pressure control valve that generates a differential pressure across it at the time of lowering operation of the boom cylinder 111A. The first boom control valve 2 is a control valve in which the opening area can be changed according to the control current supplied to the solenoid 2*a*. The controller 320 computes the cylinder velocity on the basis of the stroke of the boom cylinder 111A sensed by the stroke sensor 34. The controller 320 controls the first boom control valve 2 in such a manner that the opening area of the first boom control valve 2 becomes large according to a rise in the pressure of the low-pressure accumulator 4 sensed by the first pressure sensor 30. Furthermore, the controller 320 controls the first boom control valve 2 in such a manner that the opening area of the first boom control valve 2 becomes larger when the cylinder velocity is higher. In this configuration, the opening area of the first boom control valve 2 becomes large according to a rise in the pressure of the low-pressure accumulator 4 and therefore a rise in the bottom pressure of the boom cylinder 111A attributed to the rise in the pressure of the low-pressure accumulator 4 is suppressed. As a result, the boom cylinder 111A can be stably operated.

The hydraulic excavator 300 often executes crane work in which a wire is hung on a hook disposed at a back part of the bucket 113 and a suspended load is lifted up. In the crane work, movement of the suspended load in the upward-downward direction is executed by raising operation and lowering operation of the boom 111.

When an operator operates the operation lever 5*a* of the boom operation device 5 toward the boom lowering side, the boom cylinder 111A contracts and the boom 111 pivots in the downward direction. The return fluid from the bottom-side fluid chamber 110*a* of the boom cylinder 111A is introduced to the low-pressure accumulator 4 through the first boom control valve 2. This causes hydraulic accumulation of the low-pressure accumulator 4. In the present modification example 1, the controller 320 controls the first boom control valve 2 in such a manner that the opening area of the first boom control valve (differential pressure control valve) 2 becomes large according to a rise in the pressure of the low-pressure accumulator (hydraulic accumulator device) 4 sensed by the first pressure sensor (pressure sensor) 30. This reduces the differential pressure across the first boom control valve 2 according to the rise in the pressure of the low-pressure accumulator 4. Therefore, while the pressure of the low-pressure accumulator 4 rises, the pressure of the bottom-side fluid chamber 110*a* of the boom cylinder 111A is kept constant and velocity change of the boom cylinder 111A is suppressed. This leads to stable operation of the boom cylinder 111A and thus sway of the suspended load in the crane work can be prevented. Therefore, according to the present modification example 1, the efficiency of the crane work can be improved.

Modification Example 2

In the above-described embodiments, description has been made by taking as examples the cases in which the work machine is the hydraulic excavator 100, 200, or 300 of a crawler type. However, the present invention is not limited thereto. The present invention can be applied to various work machines such as a hydraulic excavator of a wheel type and a wheel loader.

Although the embodiments of the present invention have been described above, the above-described embodiments merely show part of application examples of the present invention and do not intend to limit the technical range of the present invention to specific configurations of the above-described embodiments.

DESCRIPTION OF REFERENCE CHARACTERS

- 2: First boom control valve (differential pressure control valve)
- 2*a*: Solenoid
- 4: Low-pressure accumulator (hydraulic accumulator device)
- 5: Boom operation device
- 13: First hydraulic pump (hydraulic pump)
- 18: Swing operation device
- 21: High-pressure accumulator (hydraulic accumulator device)
- 27: Second hydraulic pump (hydraulic pump)
- 29: Third hydraulic pump (hydraulic pump)
- 30: First pressure sensor (pressure sensor)
- 31: Second pressure sensor (pressure sensor)
- 32: Engine
- 33: Angular velocity sensor
- 34: Stroke sensor
- 100: Hydraulic excavator (work machine)
- 102: Track structure
- 103: Swing structure
- 103A: Swing motor (hydraulic actuator)
- 104: Work device
- 105: Machine body
- 106: Hydraulic system
- 110*a*: Bottom-side fluid chamber
- 110*b*: Rod-side fluid chamber
- 111: Boom
- 111A: Boom cylinder (hydraulic actuator)
- 120: Controller

121: Differential pressure computing section
122: Output converting section
130: Differential pressure control valve
130*a*: Solenoid
151: Processor
152: Volatile memory
153: Non-volatile memory
200: Hydraulic excavator (work machine)
206: Hydraulic system
220: Controller
223: First gain multiplying section
225: Subtracting section
226: Square-root extracting section
227: Second gain multiplying section
228: Dividing section
229: Output converting section
230: Differential pressure control valve
230*a*: Solenoid
230*b*: Spool
230*c*: Sleeve
300: Hydraulic excavator (work machine)
306: Hydraulic system
320: Controller
322: Velocity computing section
323: First gain multiplying section
325: Subtracting section
326: Square-root extracting section
327: Second gain multiplying section
328: Dividing section
329: Output converting section

The invention claimed is:

1. A work machine comprising:

an engine;

a hydraulic pump that is driven by the engine and delivers a pressurized fluid;

a hydraulic actuator that is operated by the pressurized fluid delivered by the hydraulic pump;

a hydraulic accumulator device that accumulates the pressurized fluid discharged from the hydraulic actuator;

a differential pressure control valve that is disposed between the hydraulic actuator and the hydraulic accumulator device and generates a differential pressure across the differential pressure control valve between a pressure of the hydraulic actuator and a pressure of the hydraulic accumulator device;

a pressure sensor that senses the pressure of the hydraulic accumulator device; and a controller that controls the differential pressure control valve on a basis of a sensing result of the pressure sensor, wherein the work machine further includes a track structure, and a swing structure swingably disposed over the track structure, the hydraulic actuator is a swing motor that causes the swing structure to swing, the differential pressure control valve is a pressure control valve in which a set differential pressure is adjusted according to a control current that is output by the controller and is supplied to a solenoid, and the differential pressure control valve is closed when a difference between a brake pressure of the swing motor and the pressure of the hydraulic accumulator device is equal to or smaller than the set differential pressure and is opened when the difference exceeds the set differential pressure, and the controller is configured to store a differential pressure characteristic that is set in advance in such a manner that the set differential pressure of the differential pressure control valve decreases as the pressure of the hydraulic accumulator device increases and that the brake pressure of the swing motor that is a pressure on an upstream side of the differential pressure control valve is kept constant even when the pressure of the hydraulic accumulator device changes, and a control current characteristic that is set in advance in such a manner that a control current value increases as the set differential pressure of the differential pressure control valve increases, refer to the differential pressure characteristic and compute the set differential pressure of the differential pressure control valve on a basis of the pressure of the hydraulic accumulator device sensed by the pressure sensor, refer to the control current characteristic and compute the control current value of the differential pressure control valve on a basis of the set differential pressure computed, and output the control current according to the control current value computed to the solenoid of the differential pressure control valve.

* * * * *